United States Patent [19]

Ninomiya

[11] Patent Number: 5,244,236
[45] Date of Patent: Sep. 14, 1993

[54] CORROSION-PREVENTIVE SLEEVE FOR DRILLED HOLE IN METAL PIPE AND TOOL FOR MOUNTING THE SAME

[75] Inventor: Hajime Ninomiya, Amagasaki, Japan
[73] Assignee: Kubota Corporation, Osaka, Japan
[21] Appl. No.: 686,662
[22] Filed: Apr. 17, 1991
[51] Int. Cl.⁵ .............................................. F16L 35/00
[52] U.S. Cl. ..................................... 285/39; 285/162; 285/197; 285/222
[58] Field of Search ............... 285/162, 197, 338, 222, 285/382.4, 382.5, 196; 16/2

[56] References Cited

U.S. PATENT DOCUMENTS

| | | | |
|---|---|---|---|
| 3,801,209 | 4/1974 | Matsuoka | 16/2 |
| 3,841,667 | 10/1974 | Sands | 285/222 X |
| 3,879,069 | 4/1975 | Oostenbrink | 285/162 |
| 3,958,313 | 5/1976 | Rossborough | 285/162 X |
| 4,365,829 | 12/1982 | Fowler | 285/162 |
| 4,589,690 | 5/1986 | Meuleman | 285/162 |
| 4,922,951 | 5/1990 | Webster | 285/197 X |

FOREIGN PATENT DOCUMENTS 2333190  6/1977  France ............................... 285/197

*Primary Examiner*—Dave W. Arola
*Attorney, Agent, or Firm*—Joseph W. Farley

[57] ABSTRACT

The invention relates to a corrosion-preventive sleeve for preventing corrosion of a drilled hole in a metal pipe, and also to a mounting tool for mounting this corrosion-preventive sleeve in such drilled hole. The corrosion-preventive sleeve comprises an elastic sleeve and a corrosion-resistant metal sleeve to be inserted into the elastic sleeve. The elastic sleeve with the corrosion-resistant metal sleeve inserted therein in its diametrically contracted state is inserted into the drilled hole. Subsequently, the tapered member of the mounting tool is passed through the metal sleeve, whereby the latter is diametrically expanded. Then, with this, the elastic sleeve is also diametrically expanded and is intimately contacted with the inner surface of the drilled hole.

11 Claims, 5 Drawing Sheets

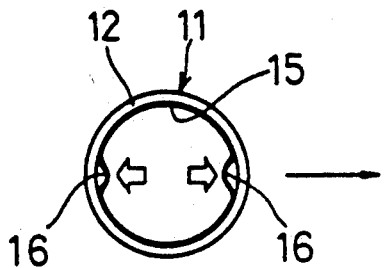
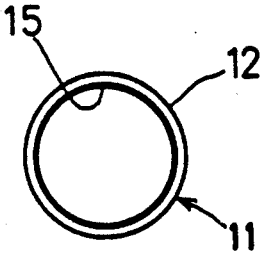
FIG.1A FIG.1B
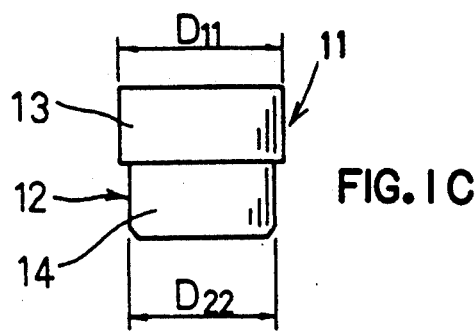
FIG.1C
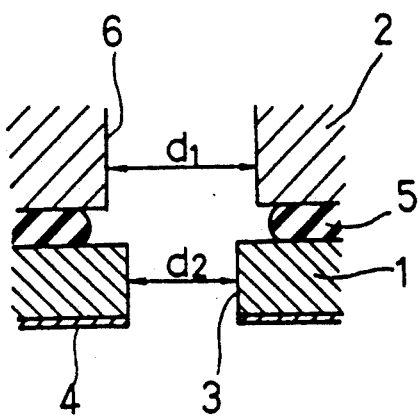
FIG.2

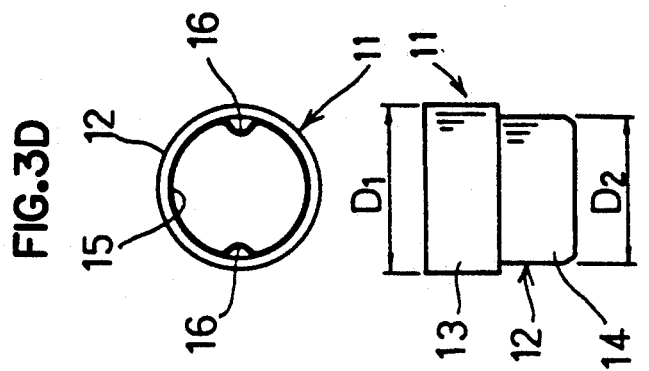
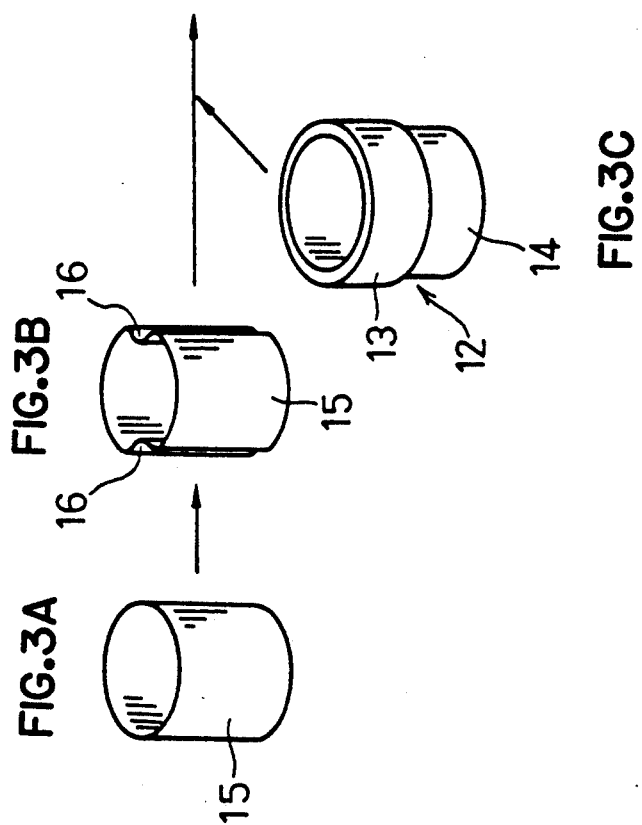

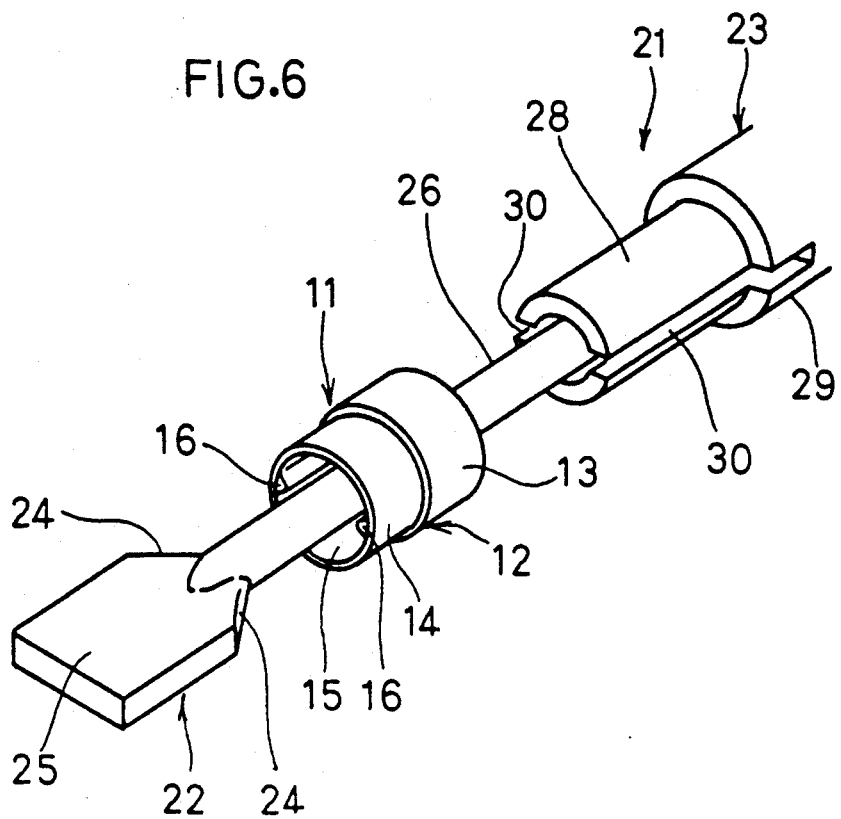
FIG.6
FIG.7
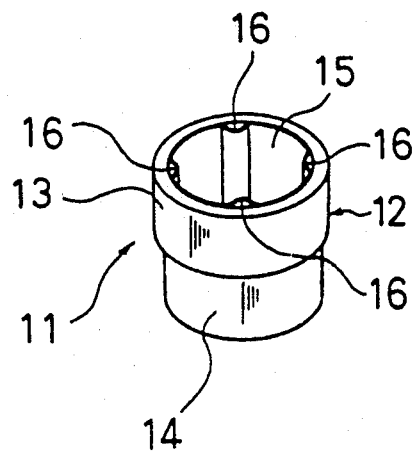
FIG.8

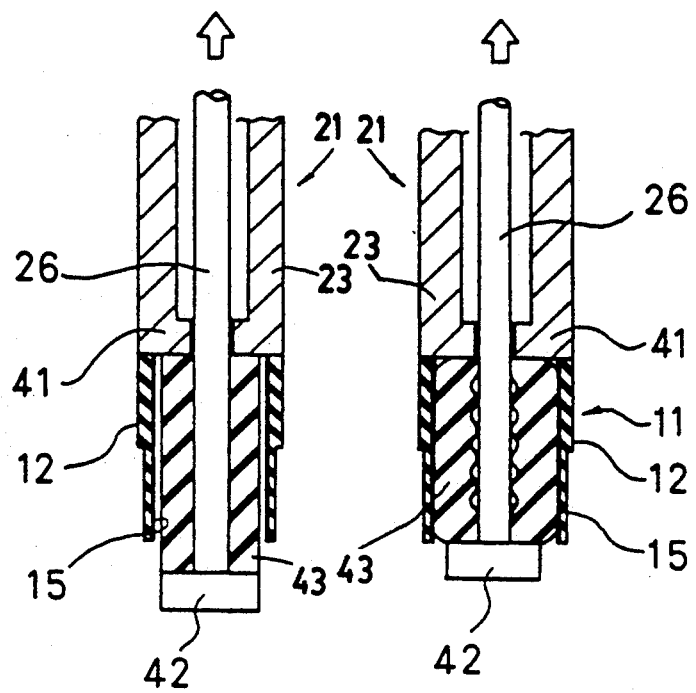
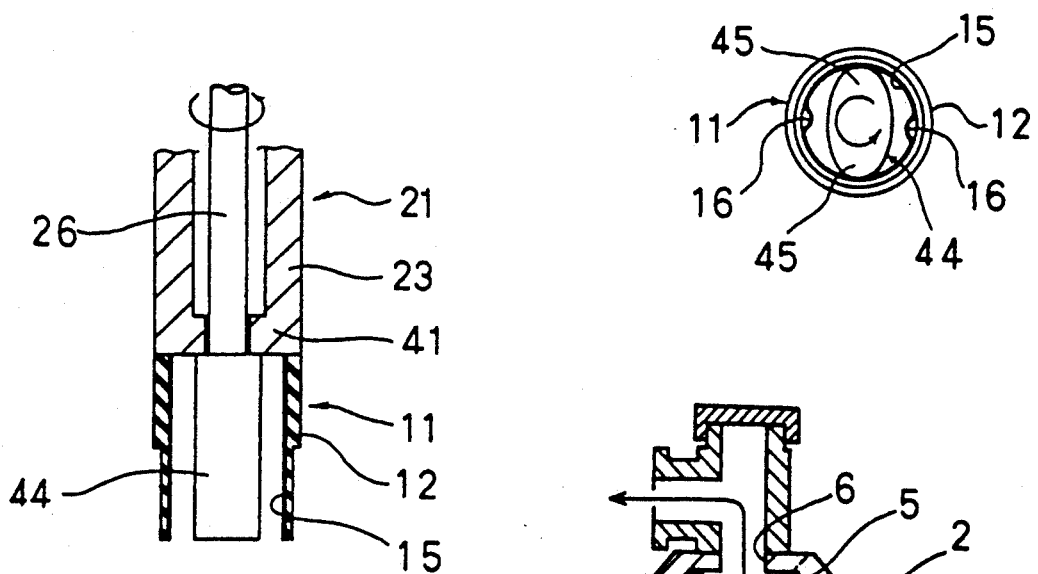
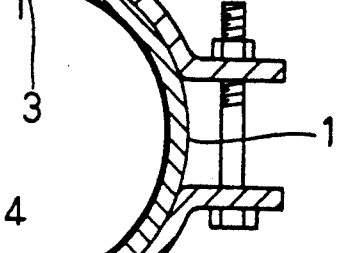

CORROSION-PREVENTIVE SLEEVE FOR DRILLED HOLE IN METAL PIPE AND TOOL FOR MOUNTING THE SAME

TECHNICAL FIELD

The present invention relates to a corrosion-preventive sleeve for a hole in a metal pipe and a tool for mounting the same.

BACKGROUND OF THE INVENTION

In the case where a metal pipe for conveying water, such as a cast iron pipe, is to be branched by a saddled water tap, the drilling of a hole in said pipe is inevitable. Such drilling results in the formation of an exposed region in the metal surface of the pipe, and since the exposed region is subjected to water flowing through the pipe, corrosion takes place, leading to the formation of "red water (containing rust)" in the terminal end of the pipe. Further, there is a danger of a corrosion product being formed in the exposed region and in the worst case, such corrosion product can close the water tapping passage in the water tap.

As a countermeasure, metal (copper) sleeves which can be inserted into drilled holes have already been marketed. However, since such metal sleeve is formed to have a smaller diameter than that of the associated drilled hole, the inner surface of the drilled hole is still subjected to running water; thus, there is almost no corrosion-preventive effect. Further, depending upon the kind of the material of the metal pipe, there is formed a cell owing to the difference in potential between the copper of the metal sleeve and the pipe, said cell accelerating corrosion.

Further, there is known a metal sleeve of copper adapted to be intimately contacted with the inner surface of the associated drilled hole, but even this arrangement tends to form a cell, leading to corrosion.

Thus, the known technical means described above are still insufficient for prevention of corrosion.

DISCLOSURE OF THE INVENTION

Accordingly, an object of the invention is to solve such problems to prevent contact between the metal portion of a pipe and water so as to prevent corrosion of the inner surface of the drilled hole.

To achieve the above object, a first corrosion-preventive sleeve of the present invention comprises;

an elastic sleeve such as of rubber to be inserted into a drilled hole, and a corrosion-resistant metal sleeve such as of stainless steel to be inserted into said elastic sleeve, said corrosion-resistant metal sleeve being insertable in a diametrically contracted state into the elastic sleeve and, when diametrically expanded in the elastic sleeve, radially outwardly pressing said elastic sleeve so as to diametrically expand the latter, said elastic sleeve being fabricated such that it is smaller in diameter than the drilled hole in said metal pipe before the insertion of said corrosion-resistant metal sleeve, the arrangement being such that when the corrosion resistant metal sleeve is diametrically expanded, said elastic sleeve tends to become greater in diameter than the inner diameter of the drilled hole so that it intimately contacts the inner surface of the drilled hole.

A second corrosion-preventive sleeve of the present invention includes an elastic sleeve such as of rubber to be inserted into a drilled hole, said elastic sleeve being insertable in a diametrically contracted deformed state into said drilled hole, the arrangement being such that when said elastic sleeve is diametrically expanded to its original state, it tends to become greater in diameter than the inner diameter of said drilled hole so that it intimately contacts the inner surface of the drilled hole.

According to these corrosion-preventive sleeves of the present invention, since the elastic sleeve diametrically expanded by the corrosion-resistant metal sleeve or the elastic sleeve having diametrically expanded by itself intimately contacts the inner surface of the drilled hole, said inner surface is prevented from contacting the water flowing through the pipe. Further, according to the first corrosion-preventive sleeve, the presence of the elastic sleeve eliminates the possibility of a cell being formed between the corrosion-resistant metal sleeve and the metal pipe; thus, corrosion is prevented.

According to a preferred embodiment of the invention, a saddled water tap is attached at a position corresponding to a drilled hole in the outer surface of a metal pipe, said saddled water tap having a water passage hole defining a branch from the metal pipe, said elastic sleeve being inserted from said water passage hole into the drilled hole and, when diametrically expanded, intimately contacting the inner surface of said drilled hole and the inner surface of said water passage hole. In such arrangement, the metal surface of the pipe, including the exposed portion of the outer surface of the pipe at the position where the saddled water tap is attached to the metal pipe, is prevented from contacting the water flowing in the pipe, so that perfect prevention of corrosion is achieved.

On the other hand, a first mounting tool of the present invention comprises;

a tapered member insertable into a pipe through a drilled hole and capable of diametrically expanding said corrosion-preventive sleeve by being passed through the corrosion-preventive sleeve inserted into the drilled hole from the outside of the pipe toward the inside of the pipe, and a rod member connected to said tapered member and serving to pull said tapered member from the inside of the pipe toward the outside of the pipe.

According to this first mounting tool, after the tapered member has been inserted into the pipe, the corrosion-preventive sleeve is fitted into the drilled hole from the outside of the pipe and with measures taken to prevent the movement of the corrosion-preventive sleeve to the outside of the pipe, the tapered member is pulled toward the outside of the pipe by the rod member, said tapered member diametrically expanding the corrosion-resistant metal sleeve to spread the elastic sleeve.

A second mounting tool of the invention comprises;

columnar elastic means of circular cross-section such as of rubber to be inserted into a corrosion-preventive sleeve, first and second flange means contacted with the opposite ends of said elastic means, and means capable of moving said two flange means toward each other to compress the opposite ends of the elastic means to diametrically expand the elastic means, thereby diametrically expanding said corrosion-preventive sleeve.

A third mounting tool of the present invention comprises;

a rotary insertable into the corrosion-protective sleeve, said rotary body having pressing means for radially outwardly pressing said corrosion-protective sleeve when it rotates, thereby diametrically expanding said corrosion-resistant sleeve.

According to these second and third mounting tools, the corrosion-preventive sleeve is radially expanded by the elastic means or pressing means, whereby said corrosion-preventive sleeve is mounted in the drilled hole.

BRIEF DESCRIPTION OF THE DRAWINGS

FIG. 1A and FIG. 1B are plan views, and FIG. 1C is an elevation showing a corrosion-protective sleeve according to an embodiment of the invention;

FIG. 2 is a view showing a drilled hole in a metal pipe on which the corrosion-preventive sleeve shown in FIG. 1 is to be mounted with its surroundings;

FIGS. 3A-3C are views showing how to make the corrosion-preventive sleeve of FIGS. 1A-1C;

FIG. 6 is a perspective view showing the mounting tool of FIG. 5 together with a corrosion-protective sleeve;

FIG. 7 is a perspective view of a corrosion-protective sleeve according to another embodiment of the invention;

FIG. 8 is a perspective view showing a corrosion-preventive sleeve according to another embodiment of the invention;

FIGS. 9A and 9B are views showing a mounting tool according to a further embodiment of the invention, said tool shown being used;

FIGS. 10 and 11 are views showing a mounting tool according to further embodiment of the invention, said tool shown being used; and FIG. 12 is a sectional view showing a metal pipe having a drilled hole in which a corrosion-preventive sleeve of the present invention is to be mounted with a water tap attached to said metal pipe.

PREFERRED EMBODIMENTS

Figure 4:
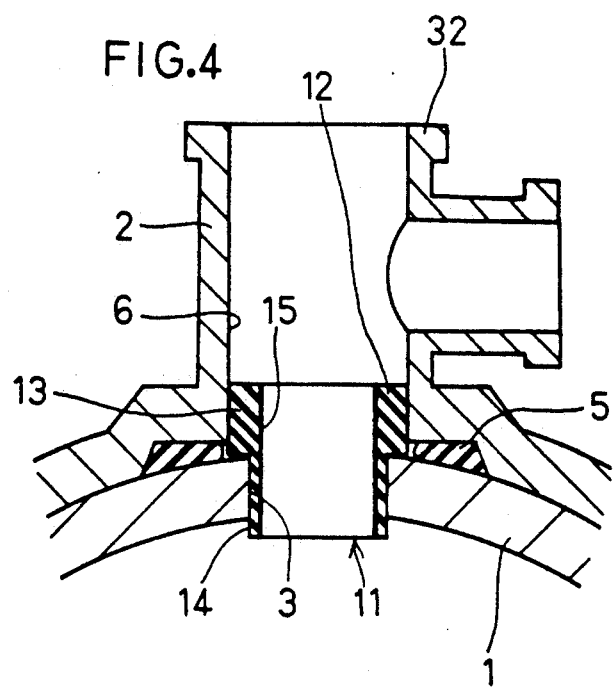
FIG. 4 is a sectional view showing the corrosion-preventive sleeve inserted into the drilled hole.

In FIG. 12, the numeral 1 denotes a metal pipe, such as a cast iron pipe, from which a branch is formed by a saddled water tap 2. The metal pipe 1 is formed with a drilled hole 3 and is formed on its inner surface with a mortar lining layer 4. A seal member 5, such as an O-ring, is compressed between the metal pipe 1 and the water tap 2. The water tap 2 is formed with a water passage hole 6.

FIG. 2 is an enlarged view showing the drilled hole 3 and its surroundings. Let $d_2$ be the inner diameter of the drilled hole 3 and $d_1$ be the inner diameter of the water passage hole 6 of the water tap 2. The hole diameters are generally determined so that $d_1 > d_2$, and usually the inner diameter of the seal member 5 is larger than the inner diameter $d_1$ of the water passage hole 6.

FIGS. 1A–1C show a corrosion-preventive sleeve 11 based on the present invention. The numeral 12 denotes an elastic sleeve of rubber, in the form of a two-step cylinder having a larger diameter portion 13 and a smaller diameter portion 14. The inner diameter of the elastic sleeve 12 is uniform throughout its length. Inserted in the elastic sleeve 12 is a corrosion-resistant metal sleeve 15 in the form of a thin-walled stainless pipe.

FIGS. 3A–3E are views for explaining how to make the corrosion-preventive sleeve 11. As shown, first, a metal sleeve 15 is radially inwardly deformed at a suitable circumferential position or positions to form one or more recesses 16, thereby diametrically contracting the metal sleeve 15. This metal sleeve 15, diametrically contracted, is inserted into the elastic sleeve 12. The inner diameter of the elastic sleeve 12 is dimensioned so that the metal sleeve 15 in its diametrically contracted state can be inserted therein without substantial clearance left therebetween. With the metal sleeve 15 inserted, the outer diameter of the larger diameter portion 13 of the elastic sleeve 12 is $D_1$ and the outer diameter of the smaller diameter portion 14 is $D_2$. The relation $D_2 < d_2 < D_1 < d_1$ holds among the dimensions of the various portions.

Figure 5:
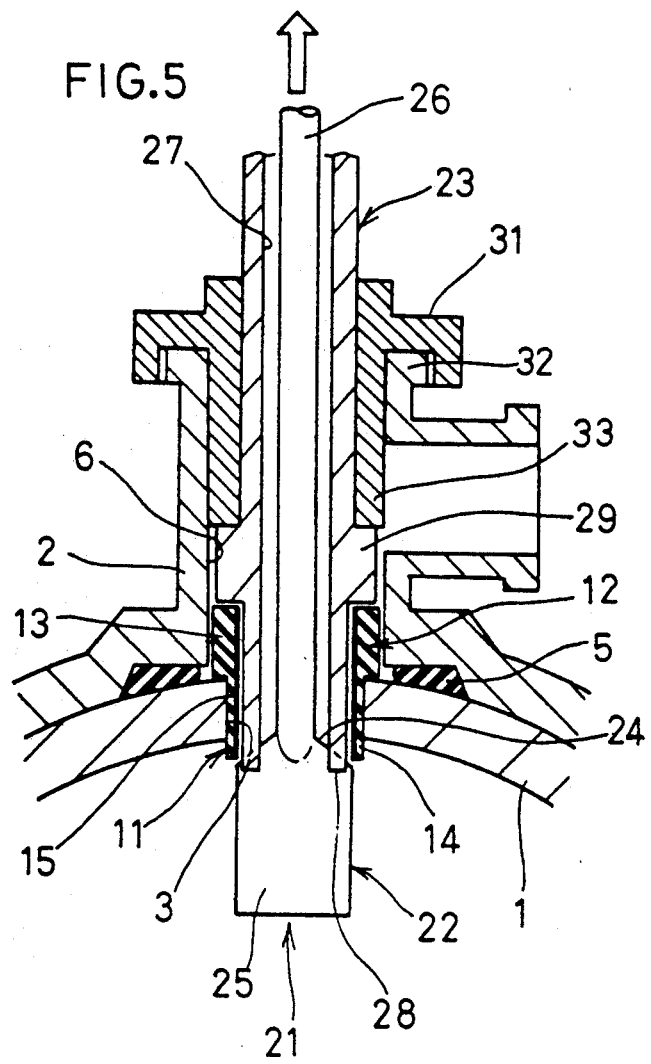
FIG. 5 is a sectional view showing how to use a mounting tool according to an embodiment of the invention.

The corrosion-preventive sleeve 11 is mounted in the portion shown in FIG. 2. Then, since $D_2 < d_2$ and $D_1 < d_1$, as shown in FIG. 5, the smaller diameter portion 14 is inserted in the drilled hole 3 and the larger diameter portion 13 is received in the water passage hole 6. Further, since $d_2 < D_1$, the step portion of the elastic sleeve 12 abuts against the outer surface of the metal pipe 1 around the drilled hole 3, thereby effecting the positioning of the corrosion-preventive sleeve 11.

Then, as shown in FIG. 1B, the recesses 16 of the metal sleeve 15 are radially outwardly deformed to diametrically expand the metal sleeve 15 to restore it to its original cylindrical form. When the metal sleeve 15 is diametrically expanded with the corrosion-preventive sleeve 11 in the free state, or not mounted in the portion shown in FIG. 2, the elastic sleeve 12 is also diametrically expanded, whereby the outer diameters of the larger and smaller portions 13 and 14 are increased to $D_{11}$ and $D_{22}$, respectively. The relations $D_{11} > d_1$ and $D_{22} > d_2$ hold among the dimensions.

Therefore, as shown in FIG. 5, the corrosion-preventive sleeve 11 is mounted at a predetermined position and the metal sleeve 15 is diametrically expanded, whereupon the smaller diameter portion 14 of the elastic sleeve 12 is intimately contacted with the inner peripheral surface of the drilled hole 3 while the larger diameter portion 13 is intimately contacted with the inner peripheral surface of the water passage hole 6, completing the mounting operation. This mounting-completed state is shown in FIG. 4. Since the elastic sleeve 12 is intimately contacted with the inner peripheral surfaces of the drilled hole 3 and water passage hole 6, in this manner, the metal surfaces of the pipe 1 including the outer surface of the pipe are prevented from contacting the water in the pipe; thus, a reliable corrosion-preventive effect can be obtained. Further, there is no possibility of the running water stagnating in the outer side of the corrosion-preventive sleeve 11 or the inner peripheral side of the seal member 5; thus, there is an advantage that there is no flow disturbance otherwise caused by such stagnation. The mounting of the metal sleeve 15 can be effected with light force by suitably determining the wall thickness thereof. The positioning is effected by the step portion of the elastic sleeve 12 abutting against the outer surface of the metal pipe 1 around the drilled hole, whereby excessive insertion into the pipe is prevented.

FIGS. 5 and 6 show a mounting tool 21 for mounting the corrosion-preventive sleeve 11 at a predetermined position. The mounting tool 21 comprises a sleeve deforming portion 22 and a sleeve retaining portion 23. The tool 21 is inserted into the water tap 2 through the opening in the water tap 2 shown in FIG. 4, with its front end inserted into the drilled hole 3. The sleeve deforming portion 22 comprises a plate-like tapered member 25 having tapered surfaces 24 at its two shoulders and a rod member 26 connected to said tapered member 25. The tapered member 25 has a width smaller than the inner diameter of the drilled hole 3 so that it can be inserted into the metal pipe 1 through the drilled hole 3. Further, the tapered member 25 is constructed so that it can be passed axially through the metal sleeve 15 with its tapered surface 24 abutting against the inner surfaces of the recesses 16 of the metal sleeve 15 to radially outwardly press the recesses 16.

The sleeve retaining portion 23 is in the form of a hollow body having a hole 27 for receiving and guiding the rod member 26 to the outside of the water tap 2. Further, the sleeve retaining portion 23 comprises a front end portion 28 insertable into the corrosion-preventive sleeve 11 with the metal sleeve 15 diametrically contracted, and a flange portion 29 adapted to abut against the end surface of the larger diameter portion 13 of the elastic sleeve 12. Further, the sleeve retaining portion 23 is formed with a pair of grooves 30 for receiving the tapered member 25 when the latter is pulled from the inside of the pipe toward the outside of the pipe by the rod member 26. The numeral 31 denotes a cap fixed in position by being fitted on the sleeve retaining portion 23 and screwed onto the open end 32 of the water tap 2. The cap 31 is formed with a cylindrical projecting portion 33 adapted to abut against the flange portion 29 when the cap 31 is screwed onto the open end 32.

In such arrangement, when it is desired to mount the corrosion-preventive sleeve 11, this is attained by inserting tapered member 25 of the sleeve deforming portion 22 of the mounting tool 21 into the pipe through the water tap 2 and drilled hole 3. Then, the corrosion-preventive sleeve 11 with the metal sleeve diametrically contracted is fitted on the rod member 26, the smaller diameter portion 14 being inserted into the drilled hole 3. And then the sleeve retaining portion 23 of the mounting tool 21 is inserted into the water tap 2, and the flange portion 29 is brought into contact with the end surface of the larger diameter portion 13 of the elastic sleeve 12. At this time, the recesses 16 of the corrosion-preventive sleeve 11 are already in alignment with the grooves 30 of the mounting tool 21. Further, the cap 31 is screwed onto the water tap 2. FIG. 5 shows the state prevailing at this time.

Then, the portion of the rod member 26 in the outside of the water tap 2 is pulled to extract the tapered member 25 from the pipe 1. Thereupon, with the corrosion-preventive sleeve 11 prevented from moving diametrically of the pipe by the flange portion 29 and cap 31, the tapered member 25 is passed through the elastic sleeve 12. Thereby, the tapered surfaces 34 act to spread the recesses 16 of the metal sleeve 15 radially outward, thereby diametrically expanding the metal sleeve 15 and contacting the elastic sleeve 12 with the drilled hole 3 and water passage hole 6. When the tapered member 25 passing through the elastic sleeve 12 is received in the grooves 30 of the sleeve retaining portion 23, the diametrically expanding operation is completed; therefore, the cap 31 is unscrewed to take the mounting tool 21 out of the water tap 2.

By such simple operation of passing the sleeve deforming portion 22 through the corrosion-preventive sleeve 11, the latter is diametrically expanded throughout the length thereof, so that the corrosion-preventive sleeve 11 can be easily mounted in the drilled hole 3 of the metal pipe 1.

FIG. 7 shows a corrosion-preventive sleeve 11 according to another embodiment of the invention. In this case, the metal sleeve 15 is provided with recesses 16 at four circumferential places. The number of recesses 16 is arbitrary; besides the illustrated number, any other number may be selected. The shape of the recesses 16 is not limited to the illustrated round shape; it may be wedge-shaped so that the metal sleeve 15 has a star-shaped cross-section.

FIG. 8 shows a corrosion-preventive sleeve 11 according to yet another embodiment of the invention. In this case, the corrosion-preventive sleeve 11 is constructed of an elastic sleeve 12 alone, the outer diameter of the smaller diameter portion 14 of said elastic sleeve 12 being greater than the inner diameter of the drilled hole 3 of the metal pipe 1. This elastic sleeve 12 is deformed by diametrical contraction as shown and its smaller diameter portion 14 is inserted into the drilled hole 3 and thereafter diametrically expanded to its original state, thereby completing the operation for mounting it in the drilled hole 3.

FIGS. 9A and 9B shows a mounting tool 21 according to another embodiment of the invention. In this case, the sleeve retaining portion 23 is formed with a flange portion 41 adapted to contact the end surface of the corrosion-preventive sleeve 11. Further, the front end of the rod member 26 is also formed with a flange portion 42. A cylindrical rubber body 43 through which the rod member 26 passes is interposed between these flange portions 41 and 42. In such arrangement, by pulling the rod member 26, the rubber body 43 is compressed between the flange portions 41 and 42 to bulge, thereby diametrically expanding the corrosion-preventive sleeve 11.

FIGS. 10 and 11 show a mounting tool 21 according to a further embodiment of the invention. In this case, the front end of the rod member 26 is provided with a pressing member 44 of rotary type having an elliptical cross-section. The pressing member 44 is dimensioned so that the front end 45 of its major axis portion contacts the inner surface of the metal sleeve 15 of the corrosion-preventive sleeve 11. As shown, by inserting the pressing member 44 into the corrosion-preventive sleeve 11 and rotating it, the front end 45 of the pressing member 44 radially outwardly presses the recesses 16 of the metal sleeve 15, whereby metal sleeve 15 is diametrically expanded and the mounting of the corrosion-preventive sleeve 11 is completed.

What is claimed is:

1. A corrosion-preventive sleeve comprising;
   an elastic sleeve adapted to be inserted into a drilled hole in a metal pipe,
   a corrosion-resistant metal sleeve adapted to be inserted into said elastic sleeve;
   means for diametrically expanding said corrosion-resistant metal sleeve;
   said corrosion-resistant metal sleeve being insertable in a diametrically contracted state into the elastic sleeve and, being diametrically expandable in the elastic sleeve, thereby radially outwardly pressing said elastic sleeve so as to diametrically expand the latter, said elastic sleeve being fabricated such that it is smaller in diameter than said drilled hole in said metal pipe before the insertion of said corrosion-resistant metal sleeve, the arrangement being such that when the corrosion-resistant metal sleeve is diametrically expanded, said elastic sleeve is radially outwardly biased into intimate contact with the inner surface of said drilled hole.

2. A corrosion-preventive sleeve as set forth in claim 1, wherein said corrosion-resistant metal sleeve is formed with at least one radially inwardly deformed axially extending recess to diametrically contract said corrosion-resistant sleeve.

3. A corrosion-preventive sleeve as set forth in claim 2 wherein said means for diametrically expanding said corrosion-resistant metal sleeve comprises:
a rotatable body insertable into said corrosion-protective sleeve,
said rotatable body having pressing means for radially outwardly pressing said recess in response to rotation of said body, thereby diametrically expanding said corrosion-resistant sleeve.

4. A corrosion-preventive sleeve as set forth in claim 1, including a step portion adapted to engage the periphery of said drilled hole on the outer surface of the metal pipe to position said corrosion-preventive sleeve radially of said metal pipe.

5. A corrosion-preventive sleeve as set forth in claim 1, wherein;
a saddled water tap having a water passage hole therethrough has a surface surrounding said water passage hole, said surface being complementary to an exterior surface of said metal pipe surrounding said drilled hole, said saddled water tap being carried on said exterior surface of said metal pipe in such a manner that said water passage hole is aligned with said drilled hole, and
said elastic sleeve is inserted through said water passage hole into said drilled hole and is adapted to contact both the inner surface of said drilled hole and the inner surface of said water passage hole when said corrosion-resistant metal sleeve is diametrically expanded.

6. A corrosion-preventive sleeve as set forth in claim 1 wherein said means for diametrically expanding said corrosion-resistant metal sleeve comprises:
a tapered member insertable into said pipe through said drilled hole and capable of diametrically expanding said corrosion-preventive sleeve inserted into the drilled hole by being passed through the corrosion-preventive sleeve from the inside of the pipe toward the outside of the pipe, and
a rod member connected to said tapered member and serving to pull said tapered member from the inside of the pipe toward the outside of the pipe.

7. A corrosion-preventive sleeve as set forth in claim 6 wherein said means for diametrically expanding said corrosion-resistant metal sleeve further comprises: a cylindrical sleeve retaining portion, said retaining portion comprising;
a hole through which the rod member is passed, and
a flange adapted to abut against the end surface of the corrosion-preventive sleeve to prevent the latter from moving radially outwardly of the metal pipe.

8. A corrosion-preventive sleeve as set forth in claim 7, wherein;
said tapered member is in the form of a plate-like body, and
said sleeve retaining portion has groove means for receiving said tapered member when the latter is passed through the corrosion-preventive sleeve from the inside of the pipe toward the outside of the pipe.

9. A corrosion-preventive sleeve as set forth in claim 1 wherein said means for diametrically expanding said corrosion-resistant metal sleeve comprises:
columnar elastic means of circular cross-section adapted to be inserted into said corrosion-preventive sleeve,
first and second flange means contactable with the opposite ends of said elastic means, and
means capable of moving said two flange means toward each other to compress the opposite ends of the elastic means to diametrically expand the elastic means, thereby diametrically expanding said corrosion-preventive sleeve.

10. A corrosion-preventive sleeve comprising:
an elastic sleeve adapted to be inserted into a drilled hole in a metal pipe;
said elastic sleeve being insertable in a diametrically contracted deformed state into said drilled hole, the arrangement being such that when said elastic sleeve is diametrically expanded to its original state, said elastic sleeve is radially outwardly biased into intimate contact with the inner surface of said drilled hole;
a saddled water tap having a water passage hole therethrough has a surface surrounding said water passage hole, said surface being complementary to an exterior surface of said metal pipe surrounding said drilled hole, said saddled water tap being carried on said exterior surface of said metal pipe in such a manner that said water passage hole is aligned with said drilled hole; and
said elastic sleeve is inserted through said water passage hole into said drilled hole and is adapted to contact both the inner surface of said drilled hole and the inner surface of said water passage hole when it is diametrically expanded.

11. A corrosion-preventive sleeve as set forth in claim 10, including a step portion adapted to engage the periphery of the drilled hole on the outer surface of the metal pipe to position said corrosion-preventive sleeve radially of said metal pipe.

* * * * *